(12) United States Patent
Wang et al.

(10) Patent No.: US 12,470,435 B2
(45) Date of Patent: Nov. 11, 2025

(54) DEEP LEARNING METHOD AND SYSTEM FOR SPECTRUM SHARING OF PARTIALLY OVERLAPPING CHANNELS

(71) Applicant: Shenzhen University, Shenzhen (CN)

(72) Inventors: Lu Wang, Shenzhen (CN); Ruifeng Huang, Shenzhen (CN); Kaishun Wu, Shenzhen (CN)

(73) Assignee: Shenzhen University, Shenzhen (CN)

( * ) Notice: Subject to any disclaimer, the term of this patent is extended or adjusted under 35 U.S.C. 154(b) by 199 days.

(21) Appl. No.: 18/281,418

(22) PCT Filed: Mar. 26, 2021

(86) PCT No.: PCT/CN2021/083271
§ 371 (c)(1),
(2) Date: Sep. 11, 2023

(87) PCT Pub. No.: WO2022/198634
PCT Pub. Date: Sep. 29, 2022

(65) Prior Publication Data
US 2024/0121136 A1     Apr. 11, 2024

(51) Int. Cl.
*H04W 28/082* (2023.01)
*H04L 25/02* (2006.01)
*H04L 5/00* (2006.01)

(52) U.S. Cl.
CPC ....... *H04L 25/0254* (2013.01); *H04W 28/082* (2023.05); *H04L 5/0057* (2013.01)

(58) Field of Classification Search
CPC . H04L 25/0254; H04L 5/0057; H04W 28/082

USPC ........................................................ 375/262
See application file for complete search history.

(56) References Cited

FOREIGN PATENT DOCUMENTS

| CN | 111126562 A | 5/2020 |
| CN | 111711666 A | 9/2020 |

OTHER PUBLICATIONS

Title of the Item: "IEEE Communications Magazine" Publication date: Sep. 17, 2018 Name of the Author: Fengxiao Tang et al. Article Title:"On a Novel Deep-Learning-Based Intelligent Partially Overlapping Channel Assignment in SDN-IoT" pp. 80-86.

*Primary Examiner* — Dominic D Saltarelli
(74) *Attorney, Agent, or Firm* — George D. Morgan

(57) ABSTRACT

The present application discloses a deep learning method and system for spectrum sharing of partially overlapping channels. The method comprises the following steps: in response to a received user transmission request, inputting, by a base station, channel state information CSI of a plurality of historical time slices into a trained channel prediction convolutional neural network model and outputting predicted channel state information CSI of a next time slice; and inputting the channel state information CSI of the next time slice into a reinforcement learning model and obtaining a channel allocation strategy of each user equipment in a collision domain of the base station so as to realize a maximum throughput of simultaneous communication of each user equipment, wherein the reinforcement learning model is obtained by training by taking bandwidth efficiency performance as a reward. The present application is high in universality, bandwidth utilization rate and throughput for communication networks.

9 Claims, 5 Drawing Sheets

DEEP LEARNING METHOD AND SYSTEM FOR SPECTRUM SHARING OF PARTIALLY OVERLAPPING CHANNELS

TECHNICAL FIELD

The present application relates to the field of communications technologies, and in particular to a deep learning method and system for spectrum sharing of partially overlapping channels.

BACKGROUND

Terminal devices, such as tablet computers, smart phones and heterogeneous Internet of Things (IoT) devices, are becoming the main bandwidth consuming component in 5G smart cities. More and more new applications are designed for terminal devices, such as interactive games, navigation, natural language processing, face recognition and augmented reality, all of which require a large number of spectrum resources. It is predicted that by 2025, networked Internet-of-Things devices will reach 41.6 billion, producing 79.4 ZB of data each year. With the emergence of various innovative applications badly in need of bandwidths, efficient spectrum management is of great importance.

In order to solve the contradiction between the spectrum scarcity problem and the insufficient utilization of the static spectrum allocation strategy, research proposes paradigm shift from fixed spectrum allocation to dynamic spectrum management (DSM). In DSM, unauthorized users who have not previously allowed transmission may now access the authorized spectrum along with authorized users. The access mode may be opportunistic spectrum access or concurrent spectrum access. In the former mode, unauthorized users can access the authorized spectrum only when not activated. In the latter mode, the unauthorized and authorized users may coexist as long as their transmissions do not exceed the interference margin of the authorized users.

Conventional DSM rarely employs partially overlapping channels (POCs) for concurrent spectrum access. Allocating appropriate POCs for concurrent transmission requires complex power control and interference cancellation algorithms, which are impractical for hardware-constrained Internet-of-Things devices. In addition, since the environment of Internet-of-Things devices is highly dynamic, it is difficult to measure the complete and accurate channel information of POC allocation. However, the proliferation of Internet-of-Things devices has resulted in their highly dense deployment in relatively small geographic areas. Therefore, the use of POCs becomes inevitable, and the full utilization of spectral efficiency in 5G smart cities shows great potential.

In recent years, artificial intelligence (AI) has achieved significant success and is being applied to DSM to address various technical challenges. The artificial intelligence technology does not require the establishment of a DSM model based on complete and accurate information, but rather can learn or explore access strategies from the surrounding environment and periodically adjust access strategies based on the dynamic environment. Recent research shows that the artificial intelligence technology can effectively improve the robustness and spectral efficiency of systems. Despite the proliferation of interests in artificial intelligence-based DSM, some challenges remain in POC allocation. For example, it is a concern how to utilize the characteristics of partially overlapping channel transmissions for concurrent spectrum access, while having a light computational overhead. Furthermore, the environment of networked Internet-of-Things devices is highly dynamic, and thus the POC allocation architecture also requires flexibility and adaptability.

SUMMARY

The present application is intended to overcome the above-mentioned defects in the prior art and provide a deep learning method and system for spectrum sharing of partially overlapping channels.

According to a first aspect of the present application, provided is a deep learning method for spectrum sharing of partially overlapping channels. The method comprises the following steps:

in response to a received user transmission request, inputting, by a base station, channel state information CSI of a plurality of historical time slices into a trained channel prediction convolutional neural network model and outputting predicted channel state information CSI of a next time slice; and inputting the channel state information CSI of the next time slice into a reinforcement learning model and obtaining a channel allocation strategy of each user equipment in a collision domain of the base station so as to realize a maximum throughput of simultaneous communication of each user equipment, wherein the reinforcement learning model is obtained by training by taking bandwidth efficiency performance as a reward.

According to a second aspect of the present application, provided is a deep learning system for spectrum sharing of partially overlapping channels. The system comprises:

a channel state prediction unit, used for inputting channel state information CSI of a plurality of historical time slices into a trained channel prediction convolutional neural network model and outputting predicted channel state information CSI of a next time slice in response to a received user transmission request; and a channel allocation unit, used for inputting the channel state information CSI of the next time slice into a reinforcement learning model and obtaining a channel allocation strategy of each user equipment in a collision domain of a base station so as to realize a maximum throughput of simultaneous communication of each user equipment, wherein the reinforcement learning model is obtained by training by taking bandwidth efficiency performance as a reward.

Compared with the prior art, the present application has the advantages that in combination with deep learning, a concurrent spectrum access system architecture based on partially overlapping channels is provided, wherein the architecture automatically learns extra coding redundancy from data of non-overlapping spectrums and applies the redundancy to data recovery on the overlapping spectrums.

Other features of the present application and advantages thereof will become apparent from the following detailed description of exemplary embodiments of the present application with reference to the accompanying drawings.

BRIEF DESCRIPTION OF DRAWINGS

The accompanying drawings, which are incorporated in and constitute a part of this specification, illustrate the embodiments of the present application and together with the description, serve to explain the principles of the present application.

In the figures, Reward represents a reward; State represents a state; Environment represents an environment; Action represents an action; Agent represents an agent; Cloud represents a cloud.

DETAILED DESCRIPTION OF THE EMBODIMENTS

Various exemplary embodiments of the present application will now be described in detail with reference to the accompanying drawings. It should be noted that: the relative arrangement of the components and steps, the numerical expressions and numerical values set forth in these embodiments do not limit the scope of the present application unless it is specifically stated otherwise.

The following description of at least one exemplary embodiment is merely illustrative in nature and is in no way intended to limit the present application, application thereof or use thereof.

Techniques, methods, and devices known to those of ordinary skills in the relevant art may not be discussed in detail, but the techniques, methods, and devices should be considered as a part of the specification where appropriate.

In all examples shown and discussed herein, any specific value should be construed as exemplary only rather than limiting. Thus, other examples of the exemplary embodiments may have different values.

It should be noted that: like reference numbers and letters refer to like items in the following figures, and thus, once an item is defined in one figure, it does not need to be further discussed in subsequent figures.

The present application discloses a deep learning method for exploring partially overlapping channels based on spectrum sharing in a 5G smart city, which is characterized in that the overlapping channels are shared innovatively by using a channel interleaving technology, a convolutional neural network is trained by using a channel state historical time slice sequence, channel state information of a next time slice is predicted, the predicted channel state information of the next time slice is taken as an input for deep reinforcement learning, and the prediction of user equipment channel allocation strategy is learned so as to maximize the throughput of a communication system.

Figure 1:
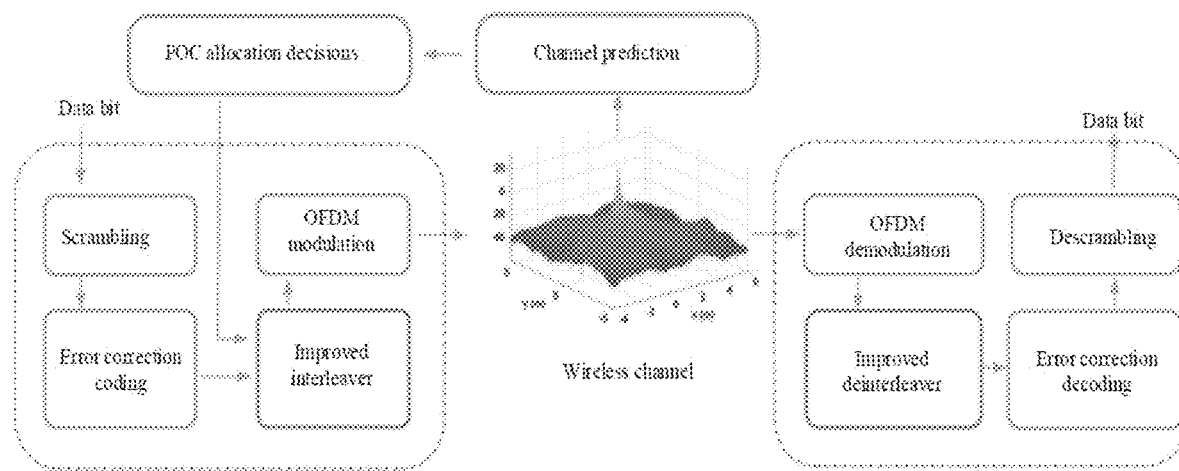
FIG. 1 is a flowchart of the implementation of a communication system according to one embodiment of the present application.
Figure 2:
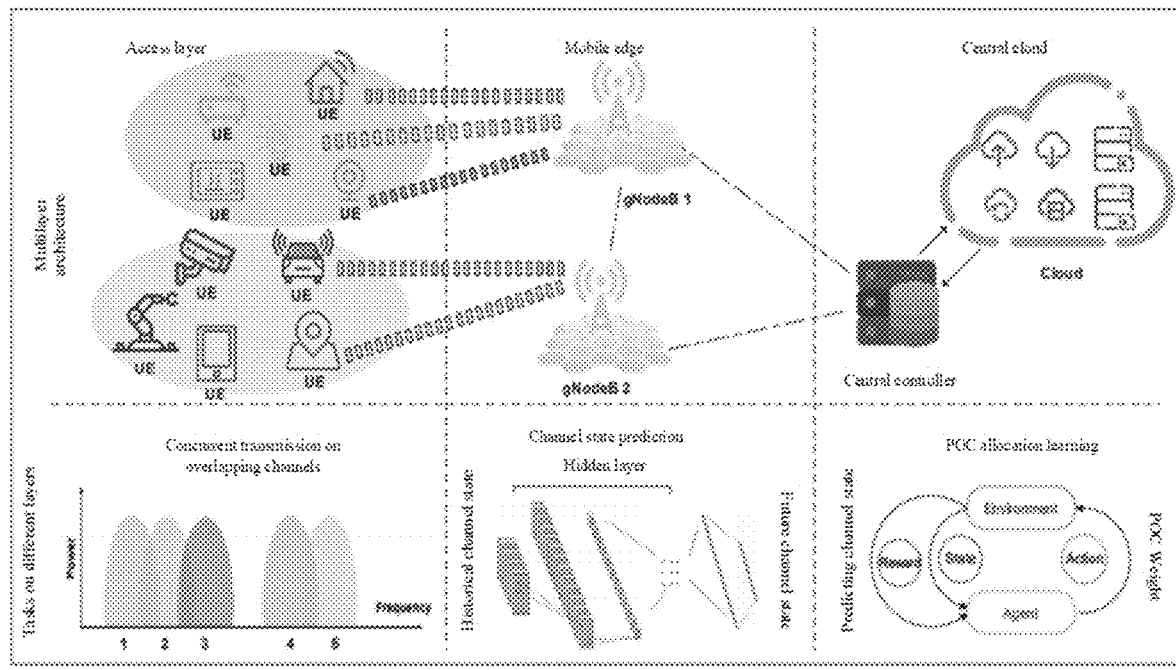
FIG. 2 is a schematic diagram of a communication system framework according to one embodiment of the present application.

With reference to FIG. 1 and FIG. 2, a communication system architecture generally comprises an access layer, a mobile edge layer and a cloud center, wherein the access layer is used for implementing concurrent transmission on overlapping channels, the mobile edge layer comprises a plurality of mobile edge base stations and is used for implementing channel state prediction, and the cloud center is used for implementing learning of a partially overlapping channel (POC) allocation strategy. In short, in the present application, the mobile edge base stations sense wireless channel state information of surrounding multiuser equipment, predicts channel state information of a next time slice by taking channel state information of K time slices before the current time as an input of a deep neural network, and strengthens the learning of a channel allocation strategy of the user equipment by taking the information as an input of a deep reinforcement learning model and taking a maximum network throughput as a goal.

Figure 3:
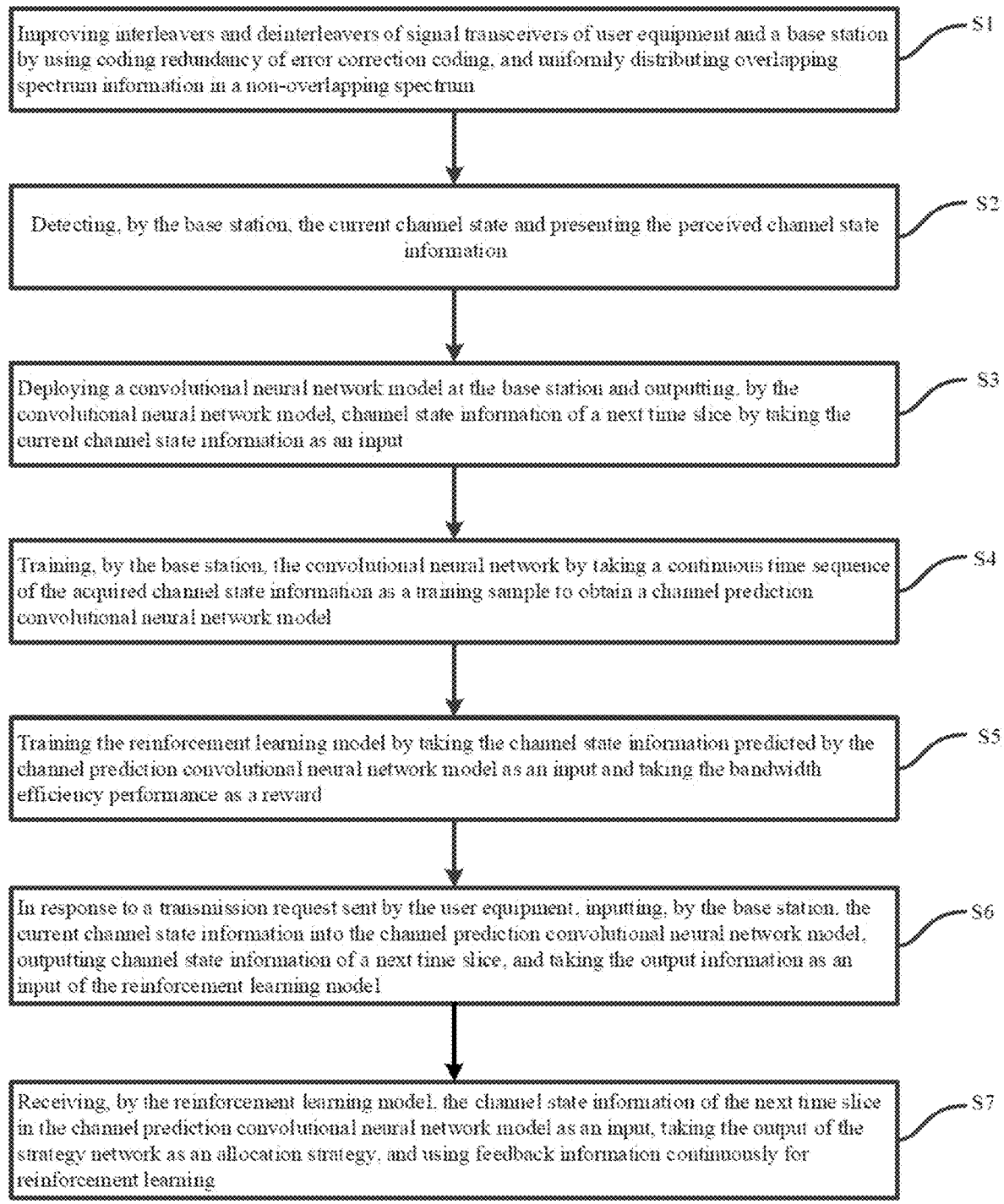
FIG. 3 is a flowchart of a deep learning method for spectrum sharing of partially overlapping channels according to one embodiment of the present application.

Specifically, referring to FIG. 3, the deep learning method for spectrum sharing of partially overlapping channels provided herein comprises the following steps.

Step S1, improving interleavers and deinterleavers of signal transceivers of user equipment and a base station by using coding redundancy of error correction coding, and uniformly distributing overlapping spectrum information in a non-overlapping spectrum.

In one embodiment, step S1 comprises the following sub-steps:

Step S101, obtaining a ratio of an overlapping channel bandwidth to a complete channel bandwidth according to the current channel state information;

Step S102, selecting an appropriate interleaving strategy according to the ratio of the overlapping channel bandwidth to the complete channel bandwidth, and assuming that channels are divided into n sub-channels; and Step S103, processing signals according to the dynamically selected interleaving strategy, uniformly distributing the signals at an overlapping part of the channels onto the n sub-channels, and performing interleaving coding by using redundant information of ECC coding.

Figure 4:
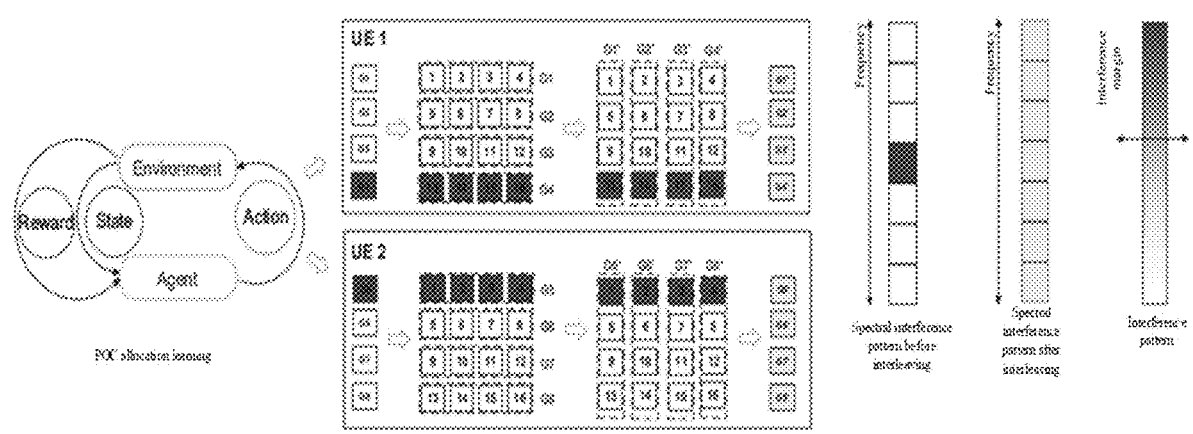
FIG. 4 is a schematic diagram of a channel interleaving implementation process according to one embodiment of the present application.

For example, as shown in FIG. 4, the channel interleaving process is as follows: the ratio of the overlapping channel bandwidth to the complete channel bandwidth is calculated and expressed as $$N_p = \frac{C_p}{C},$$

wherein $N_p$ represents a ratio of the overlapping bandwidth to the total channel bandwidth, $C_p$ represents an overlapping channel bandwidth, and C represents the total channel bandwidth; an appropriate channel interleaving strategy is selected, such as ½ interleaving, ¼ interleaving or ⅛ interleaving. Assuming that a 1/n interleaving strategy is adopted, that is, a channel is divided into n sub-channels with equal bandwidth, the nth sub-channel being an overlapping channel, and meanwhile each sub-channel is divided into n partial channels, all partial channels of each sub-channel before interleaving are uniformly dispersed in all interleaved sub-channels to achieve the purpose of channel interleaving; information interfered by the overlapping channels can be recovered by using ECC coding redundancy.

Step S2, detecting, by the base station, the current channel state and presenting the perceived channel state information.

In one embodiment, step S2 comprises the following sub-steps:

Step S201, evaluating, by a base station (gNodeB), the current channel state according to a communication request of user equipment or a channel detection signal sent by the base station per se; and Step S202, presenting, by the base station, the perceived current channel state information in a signal state information diagram manner.

Step S3, deploying a convolutional neural network model at the base station and outputting, by the convolutional neural network model, channel state information of a next time slice by taking the current channel state information as an input.

In one embodiment, step S3 comprises the following sub-steps:

Step S301, embedding the constructed convolutional neural network code for channel prediction into a base station system.

Step S302, the deep convolutional neural network comprises two main construction modules including high-dimensional CSI extraction and channel generation.

Specifically, the high-dimensional CSI extraction includes several convolutional layers. The goal is to extract the high-dimensional features of the input CSI. Then, the extracted CSI features are input for channel generation, followed by passing through the fully-connected layer for multiple times, and the generated channel is output as a final prediction result.

Step S4, training, by the base station, the convolutional neural network by taking a continuous time sequence of the acquired channel state information as a training sample to obtain a channel prediction convolutional neural network model.

In one embodiment, step S4 comprises the following sub-steps:

Step S401, acquiring, by the base station, the CSI of each user equipment in a manner such as autonomous detection and the report of user equipment, storing continuous CSI in a time sequence, and predicting, by the base station, the channel state by using CSI history; and Step S402, performing, by the base station, off-line training, for example, using a sliding window with a size of K time slices as an input, outputting channel state information of a next time slice, and using the similarity of channel state prediction as a prediction loss optimization model.

It should be noted that the K value can be set according to the requirements on the training efficiency and the training accuracy. The offline training process may be performed on a cloud center or a server.

Step S5, training the reinforcement learning model by taking the channel state information predicted by the channel prediction convolutional neural network model as an input and taking the bandwidth efficiency performance as a reward.

In one embodiment, step S5 comprises the following sub-steps:

Step S501, sending channel prediction information output in the training process of the channel prediction convolutional neural network to a deep reinforcement learning network to be taken as an input of reinforcement learning;

Step S502, implementing a channel allocation strategy by using the convolutional neural network, wherein CSI of the next time slice is taken as an input and the channel allocation strategy is taken as an output, and an action space comprises allocation probabilities of all channels; and Step S503, optimizing, by the reinforcement learning model, the channel allocation strategy by taking a maximum environmental throughput as an excitation.

Step S6, in response to a transmission request sent by the user equipment, inputting, by the base station, the current channel state information into the channel prediction convolutional neural network model, outputting channel state information of a next time slice, and taking the output information as an input of the reinforcement learning model.

In one embodiment, step S6 comprises the following sub-steps:

Step S601, sending, by the user, a communication request;

Step S602, receiving, by the base station, a user request and selecting CSI of K time slices before the current time from the CSI history;

Step S603, outputting, by the channel prediction convolutional neural network, the CSI of the next time slice by taking the CSI of the K time slices before the current time as an input; and Step S604, sending, by the channel prediction convolutional neural network, the output channel prediction information to the reinforcement learning model.

Step S7, receiving, by the reinforcement learning model, the channel state information of the next time slice in the channel prediction convolutional neural network model as an input, taking the output of the strategy network as an allocation strategy, and using feedback information continuously for reinforcement learning.

In one embodiment, step S7 comprises the following sub-steps:

Step S701, implementing, by the reinforcement learning model, the channel allocation strategy with a maximum throughput of simultaneous communication of multiuser equipment by taking the channel state information of the next time slice as an input and taking the output of the strategy network as the channel allocation strategy.

Specifically, in order to find the optimal talk-back allocation under different user channel states, a problem is first posed. Assuming that there are n pieces of user equipment (UE) in a collision domain of one gNodeB, $S_{total}$ represents a total number of blocks in a channel; $CSI_i$ is a channel state, $s_i$ and Pi represent allocated blocks and overlaps of $UE_i$, respectively, $r_i$ represents an achievable data rate of $UE_i$ under the overlap $P_i$; the goal is to maximize the overall throughput, defined by the system utility program as $U_i = \text{sum}_{i=1}^{n} r_i$.

Figure 5:
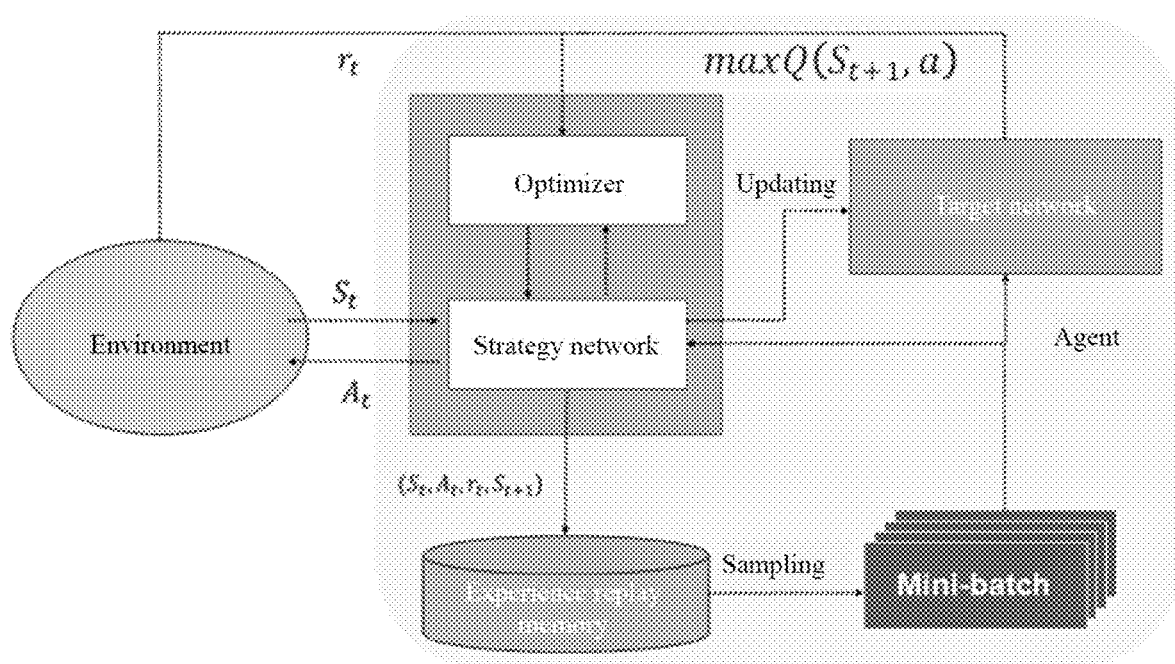
FIG. 5 is a schematic diagram of a reinforcement learning model according to one embodiment of the present application.

Herein, a deep q learning network (DQN) is used to find out the optimal strategy under different system states, i.e., the optimal POC allocation in different channel states. Each terminal CSI is input to DQN as an input. The agent action is the POC weight allocated to each terminal (i.e., the overlap allocated to each terminal). Thus, the action space includes all appropriate POC weight allocations. The system rewards are considered to be defined system utilities. FIG. 5 depicts the architecture of DQN with CSI for each UE as a system input and an approximation of a POC weight for each UE as a system output. During the training process, experience replay is employed to reduce the correlation between training samples. For DQN in this embodiment, the agent at a central controller acquires all CSI from the terminals and takes different operations (e.g., selecting different POC weights) to obtain the q-value. If a certain action is long enough to bring the q-value to maximum, then it is the action that is selected.

Step S702, taking the feedback information of the actual allocation stage as a learning sample and continuously optimizing the reinforcement learning model.

To enhance the applicability and accuracy of the reinforcement learning model, the feedback information (such as channel state information and corresponding system throughput) acquired during the actual allocation stage may be preferably taken as a sample for continuing learning.

Accordingly, the present application further provides a deep learning system for spectrum sharing of partially overlapping channels, which is used for implementing one or more aspects of the above-mentioned method. For example, the system comprises a pre-processing module, a channel interleaving module, a channel de-interleaving module, a channel state prediction module and a channel allocation module.

The pre-processing module: the base station continuously senses the channel state information in active and passive modes, divides the channel state information with continuous time into channel state information with continuous time slices, and samples the form of K-time slice sliding window and stores it as historical channel state information.

For example, for the pre-processing module, the K-time slice sliding window refers to the base station storing channel state information of K time slices before the current time. The sliding window storing K time slices is maintained, wherein the time slice window slides over time, and data in the window are kept to be up-to-date, that is, channel state information of K time slices before the current time is stored.

The channel interleaving module: by a simple overlapping channel ratio calculation method:

$$N_p = \frac{C_p}{C}$$

(wherein $N_p$ represents the ratio of the overlapping bandwidth to the total channel bandwidth, $C_p$ represents overlapping channel bandwidth, and C represents the total channel bandwidth), an appropriate channel interleaving strategy is selected, such as ½ interleaving, ¼ interleaving or ⅛ interleaving. Assuming that a 1/n interleaving strategy is adopted, that is, a channel is divided into n sub-channels with equal bandwidth, the nth sub-channel being an overlapping channel, and meanwhile each sub-channel is divided into n partial channels, all partial channels of each sub-channel before interleaving are uniformly dispersed in all interleaved sub-channels to achieve the purpose of channel interleaving; information interfered by the overlapping channels can be recovered by using ECC coding redundancy.

The channel de-interleaving module: the interleaving strategy of each transmission channel interleaving module is acquired by the channel de-interleaving module through extra information, and the de-interleaving module executes a reverse process to reform partial channels rearranged by channel interleaving and to recover the arrangement of the atomic channels.

The channel state prediction module: the base station acquires the channel state information of K historical time slices before the current time through the K-time slice sliding window, and outputs the channel state information of the next time slice by taking the channel state information of the K-time slices as the input of the convolutional neural network together so as to realize the channel prediction of the next time slice.

For example, for the channel state prediction module, the channel state information of K time slices is K relatively-independent inputs, and the K relatively-independent inputs are taken as an integral input to the channel prediction convolutional network.

The channel allocation module: the reinforcement learning model is trained by taking the maximum overall throughput as an excitation according to the predicted channel state information of the next time slice as an input, and the allocation probabilities of all allocatable sub-channels are output.

In summary, the deep learning method for spectrum sharing of partially overlapping channels provided herein is a new technical solution for implementing sharing of overlapping channels by using a channel interleaving technology. In this solution, a convolutional neural network is trained by using a channel state historical time slice sequence, channel state information of a next time slice is predicted, the prediction of a user equipment channel allocation strategy is learned by taking the predicted channel state information of the next time slice as an input for deep reinforcement learning so as to maximize the network throughput.

To further verify the effect of the present application, a system-level case study is proposed as an illustrative architecture at the PHY layer (physical layer) and the MAC layer (medium access control layer). The verification result shows that the deep learning method for spectrum sharing of partially overlapping channels provided herein is high in performance, universality, bandwidth utilization rate and throughput.

The present application may be a system, a method and/or a computer program product. The computer program product may include a computer-readable storage medium having computer-readable program instructions loaded thereon for causing a processor to implement various aspects of the present application.

The computer-readable storage medium may be a tangible device that holds and stores the instructions for use by an instruction execution device. The computer-readable storage medium may include, but is not limited to, for example, an electronic storage device, a magnetic storage device, an optical storage device, an electromagnetic storage device, a semiconductor storage device, or any suitable combination of the foregoing. More specific examples (non-exhaustive list) of the computer-readable storage medium include: a portable computer disk, a hard disk drive, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical coding device such as punch card or in-groove raised structure having instructions stored thereon, and any suitable combination of the foregoing. The computer-readable storage medium as used herein is not to be interpreted as a transitory signal per se, such as a radio wave or other freely propagating electromagnetic wave, an electromagnetic wave propagating through a waveguide or other transmission medium (e.g., optical pulses through a fiber optic cable), or an electrical signal transmitted through an electrical wire.

The computer-readable program instructions described herein may be downloaded from a computer-readable storage medium to computing/processing devices, or to an external computer or external storage device via a network, such as the Internet, a local area network, a wide area network and/or a wireless network. The network may include copper transmission cables, fiber optic transmission, wireless transmission, routers, firewalls, switches, gateway computers and/or edge servers. The network adapter card or network interface in each computing/processing device receives a computer-readable program instruction from the network and forwards the computer-readable program instruction for storage in a computer-readable storage medium in each computing/processing device.

Computer program instructions for executing operations of the present application may be assembler instructions, instruction set architecture (ISA) instructions, machine instructions, machine-related instructions, microcode, firmware instructions, state setting data, or source or object code in any combination of one or more programming languages including an object-oriented programming language such as Smalltalk, C++ and Python, and a conventional procedural programming language such as the "C" language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, aspects of the present application are implemented by personalizing an electronic circuit, such as a programmable logic circuit, a field programmable gate array (FPGA) or a programmable logic array (PLA), with state information of computer-readable program instructions, the electronic circuit being capable of executing the computer-readable program instructions.

Aspects of the present application are described herein with reference to a flowchart and/or block diagrams of methods, apparatus (systems) and computer program products according to embodiments of the present application. It should be understood that each block of the flowchart and/or block diagrams, and combinations of blocks in the flowchart and/or block diagrams, can be implemented by computer-readable program instructions.

These computer-readable program instructions may be provided to a processor of a general-purpose computer, special-purpose computer or other programmable data processing apparatus to produce a machine, such that these instructions, when being executed via the processor of the computer or other programmable data processing apparatus, create an apparatus for implementing the functions/motions specified in one or more blocks in the flowchart and/or block diagrams. These computer readable program instructions may also be stored in a computer readable storage medium, wherein these instructions can direct a computer, a programmable data processing apparatus and/or other devices to function in a particular manner, such that the computer readable medium storing the instructions comprises an article of manufacture including instructions which implement the functions/motions specified in the one or more blocks of the flowchart and/or block diagrams.

The computer-readable program instructions may also be loaded onto a computer, other programmable data processing apparatus or other devices to cause a series of operational steps to be executed on the computer, other programmable apparatus or other devices to produce a computer implemented process such that the instructions executed on the computer, other programmable apparatus or other devices implement the functions/motions specified in the one or more blocks of the flowchart and/or block diagrams.

The flowchart and block diagrams in the figures illustrate the architecture, functions, and operation of possible implementations of the system, method and computer program product according to various embodiments of the present application. In this regard, each block in the flowchart or block diagrams may represent a portion of a module, segment or instructions which comprises one or more executable instructions for implementing the specified logical functions. In some alternative implementations, the functions noted in the blocks may occur out of the order noted in the figures. For example, two blocks shown in succession may, in fact, be executed substantially concurrently, or the blocks may sometimes be executed in the reverse order, depending upon the functions involved. It should also be noted that each block in the block diagrams and/or the flowchart, and combinations of blocks in the block diagrams and/or the flowchart, can be implemented by special-purpose hardware-based systems that perform the specified functions or motions, or by combinations of special-purpose hardware and computer instructions. It is well known to those skilled in the art that the implementations by hardware and software and a combination of software and hardware are equivalent.

While various embodiments of the present application have been described above, the descriptions are exemplary, not exhaustive, and not limited to the disclosed embodiments. Many modifications and variations will be apparent to those of ordinary skill in the art without departing from the scope and spirit of the described embodiments. The terms used herein are chosen in order to best explain the principles of the embodiments, the practical application or technical improvements in the market, or to enable others of ordinary skill in the art to understand the embodiments disclosed herein. The scope of the present application is defined by the appended claims.

What is claimed is:

1. A deep learning method for spectrum sharing of partially overlapping channels, comprising the following steps:
   in response to a received user transmission request, inputting, by a base station, channel state information CSI of a plurality of historical time slices into a trained channel prediction convolutional neural network model and outputting predicted channel state information CSI of a next time slice; and
   inputting the channel state information CSI of the next time slice into a reinforcement learning model and obtaining a channel allocation strategy of each user equipment in a collision domain of the base station to realize a maximum throughput of simultaneous communication of each user equipment, wherein the reinforcement learning model is obtained by training by taking bandwidth efficiency performance as a reward;
   wherein the inputting the channel state information CSI of the next time slice into a reinforcement learning model and obtaining a channel allocation strategy of each user equipment in a collision domain of the base station to realize a maximum throughput of simultaneous communication of each user equipment comprises the following steps:
   assuming that there are n pieces of user equipment UE in the collision domain of the base station, $S_{total}$ represents a total number of blocks in a channel, $CSI_i$ is a channel state, $s_i$ and Pi represent allocated blocks and overlaps of $UE_i$, respectively, $r_i$ represents an achievable data rate of $UE_i$ under the overlap $P_i$, the goal is to maximize the overall throughput as $U_i = sum_{i-1}^n r_i$, and the reinforcement learning model is used to find out an optimal allocation strategy under different channel states, wherein the channel state information CSI of each user equipment is input to the reinforcement learning model as an input, and an agent action is a partially overlapping channel weight allocated to each user equipment, and an action space includes all available allocations of partially overlapping channel weights.

2. The method according to claim 1, wherein the channel prediction convolutional neural network model is trained according to the following steps:
acquiring channel state information CSI of target user equipment and storing the CSI in a time sequence; and
training a convolutional neural network by taking a similarity of channel state prediction as a loss, and in the training process, outputting the channel state information of the next time slice by taking a sliding window with a size of K time slices as an input to obtain the convolutional neural network satisfying an optimization target as the channel prediction convolutional neural network model, wherein K is an integer greater than or equal to 2.

3. The method according to claim 1, wherein the channel prediction convolutional neural network model comprises a plurality of convolutional layers and a plurality of fully-connected layers, the plurality of convolutional layers being used for extracting high-dimensional features of the channel state information CSI and outputting the predicted channel state information CSI of the next time slice through the plurality of fully-connected layers.

4. The method according to claim 1, wherein the reinforcement learning model is trained according to the following steps:
taking the channel state information CSI output in the training process of the channel prediction convolutional neural network model as an input of the reinforcement learning model, wherein an action space comprises allocation probabilities of all channels, and the reinforcement learning model takes a maximum environmental throughput as an excitation to optimize the channel allocation strategy.

5. The method according to claim 1, wherein for the base station and the user equipment, a channel interleaving process comprises the following steps:
obtaining a ratio of an overlapping channel bandwidth to a complete channel bandwidth according to the current channel state information CSI;
selecting an interleaving strategy according to the ratio of the overlapping channel bandwidth to the complete channel bandwidth to divide channels into n sub-channels; and
processing signals according to the selected interleaving strategy, uniformly distributing the signals at an overlapping part of the channels onto the n sub-channels, and performing interleaving coding by using redundant information of error correction coding.

6. The method according to claim 1, further comprising:
taking, by the reinforcement learning model, an output of a strategy network as a channel allocation strategy and using feedback information continuously for reinforcement learning.

7. A deep learning system for spectrum sharing of partially overlapping channels, comprising:
a channel state prediction unit, used for inputting channel state information CSI of a plurality of historical time slices into a trained channel prediction convolutional neural network model and outputting predicted channel state information CSI of a next time slice in response to a received user transmission request; and
a channel allocation unit, used for inputting the channel state information CSI of the next time slice into a reinforcement learning model and obtaining a channel allocation strategy of each user equipment in a collision domain of a base station so as to realize a maximum throughput of simultaneous communication of each user equipment, wherein the reinforcement learning model is obtained by training by taking bandwidth efficiency performance as a reward;
wherein the inputting the channel state information CSI of the next time slice into a reinforcement learning model and obtaining a channel allocation strategy of each user equipment in a collision domain of the base station to realize a maximum throughput of simultaneous communication of each user equipment comprises the following steps:
assuming that there are n pieces of user equipment UE in the collision domain of the base station, $S_{total}$ represents a total number of blocks in a channel, $CSI_i$ is a channel state, $s_i$ and Pi represent allocated blocks and overlaps of $UE_i$, respectively, $r_i$ represents an achievable data rate of $UE_i$ under the overlap $P_i$, the goal is to maximize the overall throughput as $U_i = \text{sum}_{i-1}^{n} r_i$, and the reinforcement learning model is used to find out an optimal allocation strategy under different channel states, wherein the channel state information CSI of each user equipment is input to the reinforcement learning model as an input, and an agent action is a partially overlapping channel weight allocated to each user equipment, and an action space includes all available allocations of partially overlapping channel weights.

8. A non-transitory computer-readable storage medium having a computer program stored thereon, wherein the program, when executed by a processor, implements the steps of the method according to claim 1.

9. An electronic device comprising a memory and a processor, wherein a computer program capable of operating on the processor is stored on the memory, and the processor, when executing the program, implements the steps of the method according to claim 1.

* * * * *